(12) United States Patent
Leijon et al.

(10) Patent No.: US 6,525,265 B1
(45) Date of Patent: Feb. 25, 2003

(54) HIGH VOLTAGE POWER CABLE TERMINATION

(75) Inventors: Mats Leijon, Vasteras (SE); Christian Sasse, Vasteras (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/554,953

(22) PCT Filed: Nov. 30, 1998

(86) PCT No.: PCT/EP98/07737

§ 371 (c)(1),
(2), (4) Date: Jul. 13, 2000

(87) PCT Pub. No.: WO99/29005

PCT Pub. Date: Jun. 10, 1999

(30) Foreign Application Priority Data

Nov. 28, 1997 (GB) .............................. 9725314

(51) Int. Cl.⁷ .............................. H02G 15/22
(52) U.S. Cl. .................. 174/15.5; 174/15.6; 174/125.1; 505/886
(58) Field of Search ............... 174/15.5, 15.6, 174/125.1; 505/885, 886, 887, 900, 880, 925, 926

(56) References Cited

U.S. PATENT DOCUMENTS

| | | |
|---|---|---|
| 681,800 A | 9/1901 | Lasche |
| 1,304,451 A | 5/1919 | Burnham |
| 1,418,856 A | 6/1922 | Williamson |
| 1,481,585 A | 1/1924 | Beard |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |

(List continued on next page.)

FOREIGN PATENT DOCUMENTS

| | | |
|---|---|---|
| AT | 399790 | 7/1995 |
| BE | 565063 | 2/1957 |
| CH | 391071 | 4/1965 |
| CH | 539328 | 7/1973 |

(List continued on next page.)

OTHER PUBLICATIONS

High capacity synchronous generator having no tooth stator; V.S. Kildishev et al; No. 1, 1977 pp. 11–16.

Der Asynchronmotor als Antrieb stopfbcichsloser Pumpen; E. Picmaus; Electrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

(List continued on next page.)

Primary Examiner—Dean A. Reichard
Assistant Examiner—Adolfo Nino
(74) Attorney, Agent, or Firm—Oblon, Spivak, McClelland, Maier & Neustadt, P.C.

(57) ABSTRACT

A high voltage power cable termination with a current lead, a power cable having a first tube and an outer conductor, e.g., a superconductor, whose electrically conducting properties improve at low temperatures, arranged around the first tube and intended in use to be cooled to low temperatures by cryogenic fluid flowing through the first tube, a joint for electrically connecting one end of the current lead to the conductor at one end of the cable at or adjacent to one of the first tube, and a second tube communicating with the first tube at or adjacent to the joint for conveying cryogenic fluid to or from the first tube. The first and the second tube are arranged so that, in use, no cryogenic fluid conveyed by the tubes contacts the conductor or the current lead at the joint. The invention also relates to electrical apparatus, e.g., a high voltage induction device, having such a termination.

32 Claims, 2 Drawing Sheets

U.S. PATENT DOCUMENTS

| | | | |
|---|---|---|---|
| 1,861,182 A | 5/1932 | Hendey et al. | |
| 1,974,406 A | 9/1934 | Apple et al. | |
| 2,006,170 A | 6/1935 | Juhlin | |
| 2,206,856 A | 7/1940 | Shearer | |
| 2,217,430 A | 10/1940 | Baudry | |
| 2,241,832 A | 5/1941 | Wahlquist | |
| 2,251,291 A | 8/1941 | Reichelt | |
| 2,256,897 A | 9/1941 | Davidson et al. | |
| 2,295,415 A | 9/1942 | Monroe | |
| 2,415,652 A | 2/1947 | Norton | |
| 2,424,443 A | 7/1947 | Evans | |
| 2,436,306 A | 2/1948 | Johnson | |
| 2,446,999 A | 8/1948 | Camilli | |
| 2,459,322 A | 1/1949 | Johnston | |
| 2,462,651 A | 2/1949 | Lord | |
| 2,498,238 A | 2/1950 | Berberich et al. | |
| 2,721,905 A | 10/1955 | Monroe | |
| 2,780,771 A | 2/1957 | Lee | |
| 2,846,599 A | 8/1958 | McAdam | |
| 2,885,581 A | 5/1959 | Pileggi | |
| 2,943,242 A | 6/1960 | Schaschl et al. | |
| 2,947,957 A | 8/1960 | Spindler | |
| 2,959,699 A | 11/1960 | Smith et al. | |
| 2,962,679 A | 11/1960 | Stratton | |
| 2,975,309 A | 3/1961 | Seidner | |
| 3,098,893 A | 7/1963 | Pringle et al. | |
| 3,130,335 A | 4/1964 | Rejda | |
| 3,143,269 A | 8/1964 | Van Eldik | |
| 3,157,806 A | 11/1964 | Wiedemann | |
| 3,158,770 A | 11/1964 | Coggeshall et al. | |
| 3,268,766 A | 8/1966 | Amos | |
| 3,304,599 A | 2/1967 | Nordin | |
| 3,354,331 A | 11/1967 | Broeker et al. | |
| 3,365,657 A | 1/1968 | Webb | |
| 3,372,283 A | 3/1968 | Jaecklin | |
| 3,418,530 A | 12/1968 | Cheever | |
| 3,435,262 A | 3/1969 | Bennett et al. | |
| 3,437,858 A | 4/1969 | White | |
| 3,444,407 A | 5/1969 | Yates | |
| 3,447,002 A | 5/1969 | Ronnevig | |
| 3,484,690 A | 12/1969 | Wald | |
| 3,560,777 A | 2/1971 | Moeller | |
| 3,593,123 A | 7/1971 | Williamson | |
| 3,631,519 A | 12/1971 | Salahshourian | |
| 3,644,662 A | 2/1972 | Salahshourian | |
| 3,651,402 A | 3/1972 | Leffmann | |
| 3,670,172 A | 6/1972 | Andersson et al. | |
| 3,675,056 A | 7/1972 | Lenz | |
| 3,684,821 A | 8/1972 | Miyauchi et al. | |
| 3,715,451 A * | 2/1973 | Hammer et al. | 174/15.5 |
| 3,716,652 A | 2/1973 | Lusk et al. | |
| 3,716,719 A | 2/1973 | Angelery et al. | |
| 3,727,085 A | 4/1973 | Goetz et al. | |
| 3,740,600 A | 6/1973 | Turley | |
| 3,746,954 A | 7/1973 | Myles et al. | |
| 3,758,699 A | 9/1973 | Lusk et al. | |
| 3,778,891 A | 12/1973 | Amasino et al. | |
| 3,781,739 A | 12/1973 | Meyer | |
| 3,792,399 A | 2/1974 | McLyman | |
| 3,801,843 A | 4/1974 | Corman et al. | |
| 3,809,933 A | 5/1974 | Sugawara et al. | |
| 3,881,647 A | 5/1975 | Wolfe | |
| 3,884,154 A | 5/1975 | Marten | |
| 3,891,880 A | 6/1975 | Britsch | |
| 3,902,000 A * | 8/1975 | Forsyth et al. | 174/15 BH |
| 3,932,779 A | 1/1976 | Madsen | |
| 3,932,791 A | 1/1976 | Oswald | |
| 3,943,392 A | 3/1976 | Keuper et al. | |
| 3,947,278 A | 3/1976 | Youtsey | |
| 3,965,408 A | 6/1976 | Higuchi et al. | |
| 3,968,388 A | 7/1976 | Lambrecht et al. | |
| 3,971,543 A | 7/1976 | Shanahan | |
| 3,974,314 A | 8/1976 | Fuchs | |
| 3,995,785 A | 12/1976 | Arick et al. | |
| 4,001,616 A | 1/1977 | Lonseth et al. | |
| 4,008,409 A | 2/1977 | Rhudy et al. | |
| 4,031,310 A | 6/1977 | Jachimowicz | |
| 4,038,492 A * | 7/1977 | Kullmann | 174/15 S |
| 4,039,740 A * | 8/1977 | Iwata | 174/15 S |
| 4,041,431 A | 8/1977 | Enoksen | |
| 4,047,138 A | 9/1977 | Steigerwald | |
| 4,064,419 A | 12/1977 | Peterson | |
| 4,084,307 A | 4/1978 | Schultz et al. | |
| 4,085,347 A | 4/1978 | Lichius | |
| 4,088,953 A | 5/1978 | Sarian | |
| 4,091,138 A | 5/1978 | Takagi et al. | |
| 4,091,139 A | 5/1978 | Quirk | |
| 4,099,227 A | 7/1978 | Liptak | |
| 4,103,075 A | 7/1978 | Adam | |
| 4,106,069 A | 8/1978 | Trautner et al. | |
| 4,107,092 A | 8/1978 | Carnahan et al. | |
| 4,109,098 A | 8/1978 | Olsson et al. | |
| 4,121,148 A | 10/1978 | Platzer | |
| 4,134,036 A | 1/1979 | Curtiss | |
| 4,134,055 A | 1/1979 | Akamatsu | |
| 4,134,146 A | 1/1979 | Stetson | |
| 4,149,101 A | 4/1979 | Lesokhin et al. | |
| 4,152,615 A | 5/1979 | Calfo et al. | |
| 4,160,193 A | 7/1979 | Richmond | |
| 4,164,672 A | 8/1979 | Flick | |
| 4,164,772 A | 8/1979 | Hingorani | |
| 4,177,397 A | 12/1979 | Lill | |
| 4,177,418 A | 12/1979 | Brueckner et al. | |
| 4,184,186 A | 1/1980 | Barkan | |
| 4,200,817 A | 4/1980 | Bratoljic | |
| 4,200,818 A | 4/1980 | Ruffing et al. | |
| 4,206,434 A | 6/1980 | Hase | |
| 4,207,427 A | 6/1980 | Beretta et al. | |
| 4,207,482 A | 6/1980 | Neumeyer et al. | |
| 4,208,597 A | 6/1980 | Mulach et al. | |
| 4,229,721 A | 10/1980 | Koloczek et al. | |
| 4,238,339 A | 12/1980 | Khutoretsky et al. | |
| 4,239,999 A | 12/1980 | Vinokurov et al. | |
| 4,245,182 A | 1/1981 | Aotsu et al. | |
| 4,246,694 A | 1/1981 | Raschbichler et al. | |
| 4,255,684 A | 3/1981 | Mischler et al. | |
| 4,258,280 A | 3/1981 | Starcevic | |
| 4,262,209 A | 4/1981 | Berner | |
| 4,274,027 A | 6/1981 | Higuchi et al. | |
| 4,281,264 A | 7/1981 | Keim et al. | |
| 4,292,558 A | 9/1981 | Flick et al. | |
| 4,307,311 A | 12/1981 | Grozinger | |
| 4,308,476 A | 12/1981 | Schuler | |
| 4,308,575 A | 12/1981 | Mase | |
| 4,310,966 A | 1/1982 | Brietenbach | |
| 4,317,001 A | 2/1982 | Silver et al. | |
| 4,320,645 A | 3/1982 | Stanley | |
| 4,321,518 A | 3/1982 | Akamatsu | |
| 4,330,726 A | 5/1982 | Albright et al. | |
| 4,337,922 A | 7/1982 | Streiff et al. | |
| 4,341,989 A | 7/1982 | Sandberg et al. | |
| 4,347,449 A | 8/1982 | Beau | |
| 4,347,454 A | 8/1982 | Gellert et al. | |
| 4,353,612 A | 10/1982 | Meyers | |
| 4,357,542 A | 11/1982 | Kirschbaum | |
| 4,360,748 A | 11/1982 | Raschbichler et al. | |
| 4,367,425 A | 1/1983 | Mendelsohn et al. | |
| 4,368,418 A | 1/1983 | Demello et al. | |
| 4,369,389 A | 1/1983 | Lambrecht | |
| 4,371,745 A | 2/1983 | Sakashita | |
| 4,387,316 A | 6/1983 | Katsekas | |

| | | | |
|---|---|---|---|
| 4,394,534 A * | 7/1983 | Bahder et al. ............ 174/15 S | |
| 4,403,163 A | 9/1983 | Rarmerding et al. | |
| 4,404,486 A | 9/1983 | Keim et al. | |
| 4,411,710 A | 10/1983 | Mochizuki et al. | |
| 4,421,284 A | 12/1983 | Pan | |
| 4,425,521 A | 1/1984 | Rosenberry, Jr. et al. | |
| 4,426,771 A | 1/1984 | Wang et al. | |
| 4,429,244 A | 1/1984 | Nikiten et al. | |
| 4,431,960 A | 2/1984 | Zucker | |
| 4,443,725 A | 4/1984 | Derderian et al. | |
| 4,470,884 A | 9/1984 | Carr | |
| 4,473,765 A | 9/1984 | Butman, Jr. et al. | |
| 4,475,075 A | 10/1984 | Munn | |
| 4,477,690 A | 10/1984 | Nikitin et al. | |
| 4,481,438 A | 11/1984 | Keim | |
| 4,485,266 A * | 11/1984 | Minati et al. ............ 174/15 CA | |
| 4,488,079 A | 12/1984 | Dailey et al. | |
| 4,492,089 A * | 1/1985 | Rohner et al. ............ 174/155 | |
| 4,503,284 A | 3/1985 | Minnick et al. | |
| 4,510,077 A | 4/1985 | Elton | |
| 4,517,471 A | 5/1985 | Sachs | |
| 4,523,249 A | 6/1985 | Arimoto | |
| 4,538,131 A | 8/1985 | Baier et al. | |
| 4,546,210 A | 10/1985 | Akiba et al. | |
| 4,551,780 A | 11/1985 | Canay | |
| 4,557,038 A | 12/1985 | Wcislo et al. | |
| 4,560,896 A | 12/1985 | Vogt et al. | |
| 4,565,929 A | 1/1986 | Baskin et al. | |
| 4,588,916 A | 5/1986 | Lis | |
| 4,590,416 A | 5/1986 | Porche et al. | |
| 4,594,630 A | 6/1986 | Rabinowitz et al. | |
| 4,607,183 A | 8/1986 | Rieber et al. | |
| 4,615,109 A | 10/1986 | Wcislo et al. | |
| 4,618,795 A | 10/1986 | Cooper et al. | |
| 4,619,040 A | 10/1986 | Wang et al. | |
| 4,633,109 A | 12/1986 | Feigel | |
| 4,650,924 A | 3/1987 | Kauffman et al. | |
| 4,656,316 A | 4/1987 | Meltsch | |
| 4,656,379 A | 4/1987 | McCarty | |
| 4,677,328 A | 6/1987 | Kumakura | |
| 4,687,882 A | 8/1987 | Stone et al. | |
| 4,692,731 A | 9/1987 | Osinga | |
| 4,723,104 A | 2/1988 | Rohatyn | |
| 4,737,704 A | 4/1988 | Kalinnikov et al. | |
| 4,745,314 A | 5/1988 | Nakano | |
| 4,766,365 A | 8/1988 | Bolduc et al. | |
| 4,785,138 A | 11/1988 | Brietenbach et al. | |
| 4,795,933 A | 1/1989 | Sakai | |
| 4,827,172 A | 5/1989 | Kobayashi | |
| 4,845,308 A * | 7/1989 | Womack et al. ............ 174/15.4 | |
| 4,847,747 A | 7/1989 | Abbondanti | |
| 4,853,565 A | 8/1989 | Elton et al. | |
| 4,859,810 A | 8/1989 | Cloetens et al. | |
| 4,860,430 A | 8/1989 | Raschbichler et al. | |
| 4,864,266 A | 9/1989 | Feather et al. | |
| 4,883,230 A | 11/1989 | Lindstrom | |
| 4,894,284 A | 1/1990 | Yamanouchi et al. | |
| 4,914,386 A | 4/1990 | Zocholl | |
| 4,918,347 A | 4/1990 | Takaba | |
| 4,918,835 A | 4/1990 | Wcislo et al. | |
| 4,924,342 A | 5/1990 | Lee | |
| 4,926,079 A | 5/1990 | Niemela et al. | |
| 4,942,326 A | 7/1990 | Butler, III et al. | |
| 4,947,007 A * | 8/1990 | Dew et al. ............ 174/15.5 | |
| 4,949,001 A | 8/1990 | Campbell | |
| 4,994,952 A | 2/1991 | Silva et al. | |
| 4,997,995 A | 3/1991 | Simmons et al. | |
| 5,012,125 A | 4/1991 | Conway | |
| 5,036,165 A | 7/1991 | Elton et al. | |
| 5,036,238 A | 7/1991 | Tajima | |
| 5,066,881 A | 11/1991 | Elton et al. | |
| 5,067,046 A | 11/1991 | Elton et al. | |
| 5,083,360 A | 1/1992 | Valencic et al. | |
| 5,086,246 A | 2/1992 | Dymond et al. | |
| 5,094,703 A | 3/1992 | Takaoka et al. | |
| 5,097,241 A | 3/1992 | Smith et al. | |
| 5,097,591 A | 3/1992 | Wcislo et al. | |
| 5,111,095 A | 5/1992 | Hendershot | |
| 5,124,607 A | 6/1992 | Rieber et al. | |
| 5,136,459 A | 8/1992 | Fararooy | |
| 5,140,290 A | 8/1992 | Dersch | |
| 5,153,460 A | 10/1992 | Bovino et al. | |
| 5,168,662 A | 12/1992 | Nakamura et al. | |
| 5,187,428 A | 2/1993 | Hutchison et al. | |
| 5,235,488 A | 8/1993 | Koch | |
| 5,246,783 A | 9/1993 | Spenadel et al. | |
| 5,264,778 A | 11/1993 | Kimmel et al. | |
| 5,304,883 A | 4/1994 | Denk | |
| 5,305,961 A | 4/1994 | Errard et al. | |
| 5,321,308 A | 6/1994 | Johncock | |
| 5,323,330 A | 6/1994 | Asplund et al. | |
| 5,325,008 A | 6/1994 | Grant | |
| 5,327,637 A | 7/1994 | Britenbach et al. | |
| 5,341,281 A | 8/1994 | Skibinski | |
| 5,343,139 A | 8/1994 | Gyugyi et al. | |
| 5,355,046 A | 10/1994 | Weigelt | |
| 5,365,132 A | 11/1994 | Hann et al. | |
| 5,387,890 A | 2/1995 | Estop et al. | |
| 5,397,513 A | 3/1995 | Steketee, Jr. | |
| 5,400,005 A | 3/1995 | Bobry | |
| 5,432,297 A * | 7/1995 | Dederer et al. ............ 174/15.4 | |
| 5,452,170 A | 9/1995 | Ohde et al. | |
| 5,468,916 A | 11/1995 | Litenas et al. | |
| 5,500,632 A | 3/1996 | Halser, III | |
| 5,510,942 A | 4/1996 | Bock et al. | |
| 5,530,307 A | 6/1996 | Horst | |
| 5,545,853 A | 8/1996 | Hildreth | |
| 5,550,410 A | 8/1996 | Titus | |
| 5,583,387 A | 12/1996 | Takeuchi et al. | |
| 5,587,126 A | 12/1996 | Steketee, Jr. | |
| 5,598,137 A | 1/1997 | Alber et al. | |
| 5,607,320 A | 3/1997 | Wright | |
| 5,612,291 A * | 3/1997 | Seike et al. ............ 505/872 | |
| 5,612,510 A | 3/1997 | Hildreth | |
| 5,663,605 A | 9/1997 | Evans et al. | |
| 5,672,926 A | 9/1997 | Brandes et al. | |
| 5,689,223 A | 11/1997 | Demarmels et al. | |
| 5,807,447 A | 9/1998 | Forrest | |
| 6,005,194 A * | 12/1999 | Ries ............ 174/125.1 | |
| 6,049,036 A * | 4/2000 | Metra ............ 174/15.5 | |
| 6,262,375 B1 * | 7/2001 | Engelhardt et al. ............ 174/125.1 | |

FOREIGN PATENT DOCUMENTS

| | | |
|---|---|---|
| CH | 657482 | 8/1986 |
| CH | 534448 | 2/1993 |
| DE | 40414 | 8/1887 |
| DE | 277012 | 7/1914 |
| DE | 336418 | 6/1920 |
| DE | 372309 | 3/1923 |
| DE | 387973 | 1/1924 |
| DE | 425551 | 2/1926 |
| DE | 426793 | 3/1926 |
| DE | 432169 | 7/1926 |
| DE | 433749 | 9/1926 |
| DE | 435608 | 10/1926 |
| DE | 435609 | 10/1926 |
| DE | 441717 | 3/1927 |
| DE | 443011 | 4/1927 |
| DE | 460124 | 5/1928 |
| DE | 482506 | 9/1929 |
| DE | 501181 | 7/1930 |
| DE | 523047 | 4/1931 |

| | | | | | |
|---|---|---|---|---|---|
| DE | 568508 | 1/1933 | EP | 0490705 | 6/1992 |
| DE | 572030 | 3/1933 | EP | 0571155 | 11/1993 |
| DE | 584639 | 9/1933 | EP | 0620570 | 10/1994 |
| DE | 586121 | 10/1933 | EP | 0642027 | 3/1995 |
| DE | 604972 | 11/1934 | EP | 0671632 | 9/1995 |
| DE | 629301 | 4/1936 | EP | 0676777 | 10/1995 |
| DE | 673545 | 3/1939 | EP | 0677915 | 10/1995 |
| DE | 719009 | 3/1942 | EP | 0684679 | 11/1995 |
| DE | 846583 | 8/1952 | EP | 0684682 | 11/1995 |
| DE | 875227 | 4/1953 | EP | 0695019 | 1/1996 |
| DE | 1807391 | 5/1970 | EP | 0732787 | 9/1996 |
| DE | 2050674 | 5/1971 | EP | 0738034 | 10/1996 |
| DE | 1638176 | 6/1971 | EP | 0740315 | 10/1996 |
| DE | 2155371 | 5/1973 | EP | 0751605 | 1/1997 |
| DE | 2400698 | 7/1975 | EP | 0780926 | 6/1997 |
| DE | 2520511 | 11/1976 | EP | 0802542 | 10/1997 |
| DE | 2656389 | 6/1978 | FR | 805544 | 4/1936 |
| DE | 2721905 | 11/1978 | FR | 841351 | 1/1938 |
| DE | 137164 | 8/1979 | FR | 847899 | 12/1938 |
| DE | 138840 | 11/1979 | FR | 1011924 | 4/1949 |
| DE | 2824951 | 12/1979 | FR | 1126975 | 3/1955 |
| DE | 2835386 | 2/1980 | FR | 1238795 | 7/1959 |
| DE | 2839517 | 3/1980 | FR | 2108171 | 5/1972 |
| DE | 2854520 | 6/1980 | FR | 2251938 | 6/1975 |
| DE | 3009102 | 9/1980 | FR | 2376542 | 7/1978 |
| DE | 2913697 | 10/1980 | FR | 2305879 | 10/1979 |
| DE | 2920478 | 12/1980 | FR | 2467502 | 4/1981 |
| DE | 3028777 | 3/1981 | FR | 2556146 | 6/1985 |
| DE | 2939004 | 4/1981 | FR | 2594271 | 8/1987 |
| DE | 3006382 | 8/1981 | FR | 2708157 | 1/1995 |
| DE | 3008818 | 9/1981 | GB | 123906 | 3/1919 |
| DE | 3305225 | 8/1984 | GB | 268271 | 3/1927 |
| DE | 3309051 | 9/1984 | GB | 293861 | 11/1928 |
| DE | 3441311 | 5/1986 | GB | 292999 | 4/1929 |
| DE | 3543106 | 6/1987 | GB | 319313 | 7/1929 |
| DE | 2917717 | 8/1987 | GB | 518993 | 3/1940 |
| DE | 3612112 | 10/1987 | GB | 537609 | 6/1941 |
| DE | 3726346 | 2/1989 | GB | 540456 | 10/1941 |
| DE | 4023903 | 11/1991 | GB | 589071 | 6/1947 |
| DE | 4022476 | 1/1992 | GB | 685416 | 1/1953 |
| DE | 4233558 | 3/1994 | GB | 702892 | 1/1954 |
| DE | 4409794 | 8/1995 | GB | 715226 | 9/1954 |
| DE | 4412761 | 10/1995 | GB | 723457 | 2/1955 |
| DE | 4420322 | 12/1995 | GB | 763761 | 12/1956 |
| DE | 19547229 | 6/1997 | GB | 805721 | 12/1958 |
| EP | 049104 | 4/1982 | GB | 827600 | 2/1960 |
| EP | 0493704 | 4/1982 | GB | 854728 | 11/1960 |
| EP | 0056580 A1 | 7/1982 | GB | 870583 | 6/1961 |
| EP | 078908 | 5/1983 | GB | 913386 | 12/1962 |
| EP | 0120154 | 10/1984 | GB | 965741 | 8/1964 |
| EP | 0130124 | 1/1985 | GB | 992249 | 5/1965 |
| EP | 0142813 | 5/1985 | GB | 1024583 | 3/1966 |
| EP | 0155405 | 9/1985 | GB | 1053337 | 12/1966 |
| EP | 0174783 | 3/1986 | GB | 1059123 | 2/1967 |
| EP | 0234521 | 9/1987 | GB | 1103098 | 2/1968 |
| EP | 0244069 | 11/1987 | GB | 1103099 | 2/1968 |
| EP | 0246377 | 11/1987 | GB | 1117401 | 6/1968 |
| EP | 0265868 | 5/1988 | GB | 1135242 | 12/1968 |
| EP | 0274691 | 7/1988 | GB | 1147049 | 4/1969 |
| EP | 0280759 | 9/1988 | GB | 1157885 | 7/1969 |
| EP | 0282876 | 9/1988 | GB | 1174659 | 12/1969 |
| EP | 0309096 | 3/1989 | GB | 1236082 | 6/1971 |
| EP | 0314860 | 5/1989 | GB | 1268770 | 3/1972 |
| EP | 0316911 | 5/1989 | GB | 1319257 | 6/1973 |
| EP | 0317248 | 5/1989 | GB | 1322433 | 7/1973 |
| EP | 0335430 | 10/1989 | GB | 1340983 | 12/1973 |
| EP | 0342554 | 11/1989 | GB | 1341050 | 12/1973 |
| EP | 0375101 | 6/1990 | GB | 1365191 | 8/1974 |
| EP | 0406437 | 1/1991 | GB | 1395152 | 5/1975 |
| EP | 0439410 | 7/1991 | GB | 1424982 | 2/1976 |
| EP | 0440865 | 8/1991 | GB | 1426594 | 3/1976 |

| | | | | | | |
|---|---|---|---|---|---|---|
| GB | 1438610 | 6/1976 | | WO | WO9203870 | 3/1992 |
| GB | 1445284 | 8/1976 | | WO | WO9321681 | 10/1993 |
| GB | 1479904 | 7/1977 | | WO | WO9406194 | 3/1994 |
| GB | 1493163 | 11/1977 | | WO | WO9518058 | 7/1995 |
| GB | 1502938 | 3/1978 | | WO | WO9522153 | 8/1995 |
| GB | 1525745 | 9/1978 | | WO | WO9524049 | 9/1995 |
| GB | 2000625 | 1/1979 | | WO | WO9622606 | 7/1996 |
| GB | 1548633 | 7/1979 | | WO | WO9622607 | 7/1996 |
| GB | 2046142 | 11/1979 | | WO | WO9630144 | 10/1996 |
| GB | 2022327 | 12/1979 | | WO | WO9710640 | 3/1997 |
| GB | 2025150 | 1/1980 | | WO | WO9711831 | 4/1997 |
| GB | 2034101 | 5/1980 | | WO | WO9716881 | 5/1997 |
| GB | 1574796 | 9/1980 | | WO | WO9745288 | 12/1997 |
| GB | 2070341 | 9/1981 | | WO | WO9745847 | 12/1997 |
| GB | 2070470 | 9/1981 | | WO | WO9745848 | 12/1997 |
| GB | 2071433 | 9/1981 | | WO | WO9745906 | 12/1997 |
| GB | 2081523 | 2/1982 | | WO | WO9745907 | 12/1997 |
| GB | 2099635 | 12/1982 | | WO | WO 97/45908 | 12/1997 |
| GB | 2105925 | 3/1983 | | WO | WO9745912 | 12/1997 |
| GB | 2106306 | 4/1983 | | WO | WO9745914 | 12/1997 |
| GB | 2106721 | 4/1983 | | WO | WO9745915 | 12/1997 |
| GB | 2136214 | 9/1984 | | WO | WO9745916 | 12/1997 |
| GB | 2140195 | 11/1984 | | WO | WO9745918 | 12/1997 |
| GB | 2268337 | 1/1994 | | WO | WO9745919 | 12/1997 |
| GB | 2273819 | 6/1994 | | WO | WO9745920 | 12/1997 |
| GB | 2283133 | 4/1995 | | WO | WO9745921 | 12/1997 |
| GB | 2289992 | 12/1995 | | WO | WO9745922 | 12/1997 |
| GB | 2308490 | 6/1997 | | WO | WO9745923 | 12/1997 |
| JP | 60206121 | 3/1959 | | WO | WO9745924 | 12/1997 |
| JP | 57043529 | 8/1980 | | WO | WO9745925 | 12/1997 |
| JP | 59076156 | 10/1982 | | WO | WO9745926 | 12/1997 |
| JP | 59159642 | 2/1983 | | WO | WO9745927 | 12/1997 |
| JP | 6264964 | 9/1985 | | WO | WO9745928 | 12/1997 |
| JP | 1129737 | 5/1989 | | WO | WO9745929 | 12/1997 |
| JP | 3245748 | 2/1990 | | WO | WO9745930 | 12/1997 |
| JP | 4179107 | 11/1990 | | WO | WO9745931 | 12/1997 |
| JP | 318253 | 1/1991 | | WO | WO9745932 | 12/1997 |
| JP | 424909 | 1/1992 | | WO | WO9745933 | 12/1997 |
| JP | 5290947 | 4/1992 | | WO | WO9745934 | 12/1997 |
| JP | 6196343 | 12/1992 | | WO | WO9745935 | 12/1997 |
| JP | 6233442 | 2/1993 | | WO | WO9745936 | 12/1997 |
| JP | 6325629 | 5/1993 | | WO | WO9745937 | 12/1997 |
| JP | 7057951 | 8/1993 | | WO | WO9745938 | 12/1997 |
| JP | 7264789 | 3/1994 | | WO | WO9745939 | 12/1997 |
| JP | 8167332 | 12/1994 | | WO | WO9747067 | 12/1997 |
| JP | 8264039 | 11/1995 | | WO | WO9820595 | 5/1998 |
| JP | 9200989 | 1/1996 | | WO | WO9820596 | 5/1998 |
| LU | 67199 | 3/1972 | | WO | WO9820597 | 5/1998 |
| SE | 90308 | 9/1937 | | WO | WO 98/20598 | 5/1998 |
| SE | 305899 | 11/1968 | | WO | WO9820600 | 5/1998 |
| SE | 255156 | 2/1969 | | WO | WO 98/20602 | 5/1998 |
| SE | 341428 | 12/1971 | | WO | WO9821385 | 5/1998 |
| SE | 453236 | 1/1982 | | WO | WO9827634 | 6/1998 |
| SE | 457792 | 6/1987 | | WO | WO9827635 | 6/1998 |
| SE | 502417 | 12/1993 | | WO | WO9827636 | 6/1998 |
| SU | 792302 | 1/1971 | | WO | WO9829927 | 7/1998 |
| SU | 425268 | 9/1974 | | WO | WO9829928 | 7/1998 |
| SU | 1019553 | 1/1980 | | WO | WO9829929 | 7/1998 |
| SU | 694939 | 1/1982 | | WO | WO9829930 | 7/1998 |
| SU | 955369 | 8/1983 | | WO | WO9829931 | 7/1998 |
| SU | 1511810 | 5/1987 | | WO | WO9829932 | 7/1998 |
| WO | WO8202617 | 8/1982 | | WO | WO9833731 | 8/1998 |
| WO | WO8502302 | 5/1985 | | WO | WO9833736 | 8/1998 |
| WO | WO9011389 | 10/1990 | | WO | WO9833737 | 8/1998 |
| WO | WO9012409 | 10/1990 | | WO | WO9834238 | 8/1998 |
| WO | WO9101059 | 1/1991 | | WO | WO 98/34239 | 8/1998 |
| WO | WO9101585 | 2/1991 | | WO | WO9834240 | 8/1998 |
| WO | WO9107807 | 3/1991 | | WO | WO9834241 | 8/1998 |
| WO | WO9109442 | 6/1991 | | WO | WO9834242 | 8/1998 |
| WO | WO8115862 | 10/1991 | | WO | WO9834243 | 8/1998 |
| WO | WO9201328 | 1/1992 | | WO | WO9834244 | 8/1998 |

| | | |
|---|---|---|
| WO | WO9834245 | 8/1998 |
| WO | WO9834246 | 8/1998 |
| WO | WO9834247 | 8/1998 |
| WO | WO9834248 | 8/1998 |
| WO | WO9834249 | 8/1998 |
| WO | WO9834250 | 8/1998 |
| WO | WO9834309 | 8/1998 |
| WO | WO9834312 | 8/1998 |
| WO | WO9834315 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

An EHV bulk Power transmission line Made with Low Loss XLPE Cable; Ichihara et al; 8/92;pp. 3–6.

Underground Transmission Systems Reference Book; 1992;pp. 16–19; pp. 36–45; pp. 67–81.

Power System Stability and Control; P. Kundur, 1994;pp23–25; p. 767.

Six phase Synchronous Machine with AC and DC Stator Connections, Part II:Harmonic Studies and a proposed Uninterruptible Power Supply Scheme; R. Schiferl et al.;Aug. 1983 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf grosser Turbogeneratoren bis 2GVA, 6OkV; G. Aicholzer; Sep. 1974, pp. 249–255.

Advanced Turbine–generators– an assessment; A. Appleton, et al; International Conf. Proceedings, Lg HV Elec. Sys. Paris, FR, Aug.–Sep./ 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer™:A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al; IEEE Translation Journal of Magnetics in Japan vol. 4, No. 9, Sep. 1989.

A study of equipment sizes and constraints for a unified power flow controller; J Bian et al; IEEE 1996.

Shipboard Electrical Insulation; G. L. Moses, 1951, pp. 2&3.

ABB Elkrafthandbok; ABB AB; 1988; pp. 274–276.

Elkraft teknisk Handbok, 2 Elmaskiner; A. Alfredsson et al; 1988, pp. 121–123.

High Voltage Cables in a New Class of Generators Powerformer; M. Leijon et al; Jun. 14, 1999; pp. 1–8.

Ohne Tranformator direkt ins Netz; Owman et al, ABB, AB; Feb. 8, 1999; pp. 48–51.

Submersible Motors and Wet–Rotor Motors for Centrifugal Pumps Submerged in the Fluid Handled; K.. Bienick, KSB; Feb. 25, 1988; pp. 9–17.

High Voltage Generators; G. Beschastnov et al; 1977; vol. 48. No. 6 pp. 1–7.

Eine neue Type von Unterwassermotoren; Electrotechnik und Maschinebam, 49; Aug. 1931; pp. 2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub.86, vol. 8, pp. 25–31.

Hydroalternators of 110 to 220 kV Elektrotechn. Obz., vol. 64, No. 3, ppI32–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1 –11; G. Aichholzer.

Optimizing designs of water–resistant magnet wire; V. Kuzenev et al; Elektrotekhnika, vol. 59, No. 12, pp. 35–40, 1988.

Direct Generation of alternating current at high voltages; R. Parsons; IEEE Journal, vol. 67 #393, Jan. 15, 1929; pp. 1065–1080.

Stopfbachslose Umwalzpumpen– ein wichtiges Element im modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Anwendung moderner Tauchpumpen; A. Heumann; 1987.

* cited by examiner

HIGH VOLTAGE POWER CABLE TERMINATION

CROSS REFERENCE TO RELATED PATENT DOCUMENTS

The present document is based on published International Patent Application No. WO 99/29005, the entire contents of which being incorporated herein by reference.

BACKGROUND OF THE INVENTION

1. Field of the Invention

This invention relates to a power cable termination for connecting cryogenic high voltage apparatus to a room temperature high voltage line. In particular, but not exclusively, the invention relates to a superconducting power cable termination, such as a termination for a high-temperature (high-$T_c$) superconducting power cable. The invention also relates to a power cable provided with such a termination and electrical apparatus, such as a power transformer or generator, provided with such a termination. The cable termination is intended to be able to deal with very high operating voltages, e.g., up to 800 kV or more.

2. Discussion of the Background

There are two main functions of a termination for a superconducting power cable. Firstly there is the requirement for converting the high radial electric field in a superconducting cable to an axial electric field after the termination. Secondly, there is the need for the termination to be able to provide the transition between room and cryogenic temperatures. A third requirement is for the termination to be designed for high voltages.

Development work on a termination for a high-$T_c$ superconducting (hereinafter referred to as HTS) cable is described in an article entitled "Development of Termination for the 77KV-Class High $T_c$ Superconducting Power Cable" by T. Shimonosono, T. Masuda and S. Isojima in IEEE Transaction on Power Delivery, Vol. 12, No. 1, January 1997. The main disadvantage of terminations of this known type is that such terminations use liquid nitrogen both as a coolant and as a dielectric. Nitrogen gas bubbles are produced due to the heat inlet and joule heat and these nitrogen bubbles are believed to cause breakdown of the current lead of the termination at increased power levels.

SUMMARY OF THE INVENTION

An aim of the present invention is to provide a termination for a cryogenically cooled power cable which overcomes the problems of breakdown associated with known terminations.

A further aim of the present invention is to dispense with the use of liquid nitrogen for electrical insulation of the termination.

According to one aspect of the present invention there is provided a power cable termination having a current lead, a power cable having an inner first tube and an outer conductor, whose electrically conducting properties improve at low temperatures, arranged around the first tube and intended in use to be cooled to low temperatures by cryogenic fluid flowing through the first tube, a joint electrically connecting one end of the current lead to the conductor at one end of the cable at or adjacent to one end of the first tube, and a second tube communicating with the first tube at or adjacent to the joint for conveying cryogenic fluid to or from the first tube, the first and second tubes being arranged so that, in use, no cryogenic fluid conveyed by the tubes contacts the conductor or the current lead at the joint.

In use of the termination, the cryogenic fluid, e.g. liquid nitrogen, conveyed through the first and second tubes acts solely as a cooling medium for the conductor and does not serve as an electrically insulating medium at the joint. Thus a different medium can be used to provide electrical insulation of the conductor and the current lead at the joint.

In most practical applications, the conductor has superconducting properties. However, the invention is not intended to be limited to conductors having superconducting properties and is intended to cover any conductor whose electrical conducting properties significantly improve at low temperatures, e.g. at temperatures below 200 K, preferably below 100 K, e.g. 77 K. In the preferred case of the conductor having superconducting properties, the conductor may include low temperature semiconductors but preferably has a high-Tc superconductor. For example the high-Tc superconductor may be silver sheathed BSCCO wire or tape, such as BSCCO-2223 (where the numerals indicate the number of atoms of each element in the [Bi, Pb]$_2$Sr$_2$Ca$_2$CU$_3$O$_x$ molecule) or BSCCO-2212. Other examples of known HTS tapes are TiBa$_2$Ca$_2$Cu$_3$O$_x$ (TBCCO-1223) and YBa$_2$Cu$_3$O$_x$(YBCO-123).

The power cable suitably has a main portion in which the conductor is surrounded by electrical insulation, e.g. of solid polymeric material, which, in use of the cable, provides a radial electric field contained within the surrounding electrical insulation, a cable terminating device spaced from said one end of the power cable for converting, in use of the cable, the radial electric field to a substantially axial electric field, and an end portion extending from the cable terminating device to the said one end of the power cable. Conveniently the joint has a high electric potential metallic corona shield to which the conductor lead and the conductor are connected, e.g by soldering.

Preferably, the electrical insulation surrounding the conductor has an inner layer of semiconducting material which is electrically connected to the conductor and an intermediate layer of electrically insulating material which surrounds the semiconducting inner layer. The said main portion of the cable also has an outer layer of semiconducting material, which is connected to a controlled electric potential, preferably earth potential, along its length, and which surrounds the said intermediate layer of electrically insulating material. This semiconducting outer layer is not present along the length of the said end portion of the cable, e.g. it is removed to reveal the underlying intermediate layer.

In this specification the term "semiconducting material" means a substance which has a considerably lower conductivity than an electric conductor but which does not have such a low conductivity that it is an electric insulator. Suitably, but not exclusively, the semiconducting material will have a resistivity of from 1 to 105 ohm·cm, preferably from 10 to 500 ohm·cm and most preferably from 10 to 100 ohm·cm, typically 20 ohm·cm.

The intermediate layer preferably includes a polymeric material such as, for example, low density polyethylene (LDPE), high density polyethylene (HDPE), polypropylene (PP), cross-linked materials such as cross-linked polyethylene (XLPE) or rubber insulation such as ethylene propylene rubber (EPR) or silicone rubber. The semiconducting layers are formed of similar polymeric materials but with highly electrically conductive particles, e.g. carbon black or metallic particles, embedded therein. Typical examples of materials for the insulating and semiconducting layers are disclosed in U.S. Pat. No. 4,785,138.

Preferably a string of axially arranged annular insulating elements, e.g. of porcelain, glass, polymeric material or rubber material, such as silicone rubber or EPR, surround the said end portion of the cable and extend between the cable terminating device and the joint. The annular insulating elements prevent creepage along the outside of the electrical insulation of the end portion of the cable.

In a first design of termination, the superconductor is arranged around the first tube but not around the second tube which is intended to connect the first tube to cryogenic fluid cooling apparatus. The second tube may be led directly away from the termination at the joint. Alternatively, however, the second tube may be positioned back along or around the outside of the superconductor so as to extend back from the joint towards the cable terminating device inside the string of annular insulating elements before being led away from the termination. In this case, the second tube is preferably wound around the layer of superconductor surrounding the first tube. Preferably solid thermal insulation, e.g. of polymeric material having an electric field stress $\leq 0.2$ kV/mm, is positioned between the second tube and the surrounding string of annular insulating elements. The portion of the second tube leading away from the termination is preferably surrounded by thermal insulation.

According to a second design of termination, the first and second tubes have coolant supply and return ducts of a central coolant dusting member of the power cable around which the conductor, e.g. superconductor, in tape or wire form, is helically wound. Thus the conductor is wound around both the first and second tubes. The central coolant ducting member may be divided internally to provide said first and second tubes, the first and second tubes communicating with each other at the said one end of the first tube. In its simplest form, the internal division of the central coolant ducting member is provided by a diametric partition wall. However to improve thermal efficiency and to ensure bending in all directions, the ducking member and/or the internal partition wall, may be helically twisted. As an alternative to internally dividing the central coolant ducting member, the latter may be formed as a single tube having a return bend portion at the joint connecting the first and second tubes which convey the cryogenic fluid in opposite directions in the power cable.

According to other aspects of the present invention there is provided a power cable and electrical apparatus provided with a termination according to said one aspect of the present invention.

BRIEF DESCRIPTION OF THE DRAWINGS

Embodiments of the invention will now be described, by way of example only, with particular reference to the accompanying drawings, in which.

DESCRIPTION OF THE PREFERRED EMBODIMENTS

Figure 1:
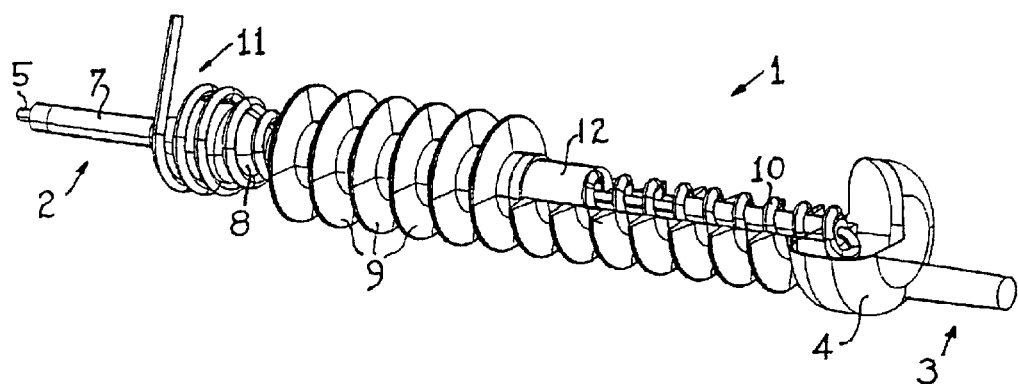
FIG. 1 is a schematic, partially cut away, perspective view of one embodiment of a power cable termination according to the invention.

FIG. 1 shows a superconducting high voltage power cable termination, generally designated by the reference numeral 1, for terminating a high-$T_c$ superconducting cable (or HTS cable) 2. In addition to the cable 2, the termination 1 has a current lead 3, e.g. a high voltage metal connection to an overhead line (not shown), and a corona shield 4 in the form of a metallic toroid to which the HTS cable 2 and current lead 3 are electrically connected, e.g. by soldering. The corona shield 4 has internal and/or external thermal insulation (not shown).

The HTS cable 2 suitably has a centrally positioned support or first tube 5 on which superconducting wire or tape (not shown), e.g. silver-sheathed BSCCO wire or tape, is helically wound. Electrical insulation 7 is provided, e.g., extruded, around the helically wound tape along a main part of the cable 2 up to a cable terminating cone or device 8. The electrical insulation 7 suitably has inner and outer layers of semiconducting material and an intermediate layer of electrically insulating material positioned between the layers of semiconducting material. Suitably, but not exclusively, the semiconducting material will have a volume resistivity of from 1 to $10^5$ ohm·cm, preferably from 10 to 500 ohm·cm and most preferably from 50 to 100 ohm·cm e.g. 20 ohm·cm. The insulating layer conveniently includes a solid polymeric material, examples of which are low and high density polyethylene (LDPE and HDPE), polypropylene (PP), polybutylene (PB), polymethylpentene (PMP), ethylene (ethyl) acrylate copolymer, cross-linked materials such as cross-linked polyethylene (XLPE) or rubber insulation such as ethylene propylene rubber (EPR) or silicone rubber. The semiconducting layers are formed of similar polymeric materials but with highly electrically conductive particles, e.g. carbon black or carbon soot, embedded therein. Typical examples of materials for the insulating and semiconducting layers are disclosed in U.S. Pat. No. 4,785,138.

The semiconducting inner layer of the electrical insulation is electrically connected with the superconducting wire or tape. The semiconducting outer layer is connected to a controlled electric potential, preferably earth potential, so that the electric field generated by the HTS power cable 2 is radially contained within the electrical insulation 7. Conveniently the semiconducting outer layer is electrically to the controlled electric potential at spaced apart region" along its length.

The electrical insulation 7 should conveniently be such that the electric field stress is less than or equal to 0.2 kV/mm in any gaseous space inside or outside the termination. This will ensure that no electrical discharges occur around the termination.

At the cable terminating device 8, the outer layer of semiconducting material is stripped from the insulation 7 to reveal the underlying electrically insulating material along an end portion of the cable 2 between the cable terminating device 8 and the corona shield 4. The electrical insulation around the superconducting tape or wire supported on the first tube 5 along said end portion of the cable 2 is provided firstly by the inner layer of semiconducting material and the surrounding intermediate layer of electrically insulating material and secondly by a plurality of annular electrically insulating elements 9, e.g. of porcelain, arranged in a string for preventing creepage.

At the end of the cable 2, the superconducting wire or tape wound around the first tube 5 is electrically connected to the corona shield 4 and the current lead 3. Also a second tube 10 of electrically non-conductive material is connected to, so as to communicate internally with, the first tube 5. The first and second tubes may be integrally formed as a single tube or may be two separate, joined together, tubes. However, the second tube 10 has no superconducting wire or tape wound therearound. The second tube 10 is wound back along the end portion of the cable 2 between the layer of electrically insulating material and the string of insulating elements 9. The second tube 10 is wound around the terminating device 8 and exits the termination at 11 for connection to a cooling machine (not shown) for cooling cryogenic coolant fluid conveyed by the tubes 5 and 10. The exit point 11 is thus at a position where there is no electric field surrounding the cable 2. In other embodiments (not shown), the exit point 11 could be spaced a short distance from the device 8 between the device 8 and the corona shield 4 so that the point 11 would be at a relatively low electric potential compared with the high electric potential at the corona shield 4. The tube 10 is surrounded by thermal insulation 12 inwardly of the insulating elements 9 and by further thermal insulation (not shown) between the termination 1 and the cooling machine. The thermal insulation 12 is shown cut away in FIG. 1, but would in practice completely surround the coiled second tube 10 between the corona shield 4 and the exit point 11.

The exterior of the electrical insulation 7 and the cable terminating device 8 are at a controlled electric potential, preferably earth potential, which contrasts with the very high electrical potential of the corona shield 4. The string of electrical insulators 9 prevent creepage, i.e. prevent leakage of electricity along the surrounded surface of the cable insulation between the corona shield 4 and the cable terminating device 8. At the cable terminating cone or device 8, the radial electric field around the superconducting cable 2 is converted to an axial field.

Figure 2:
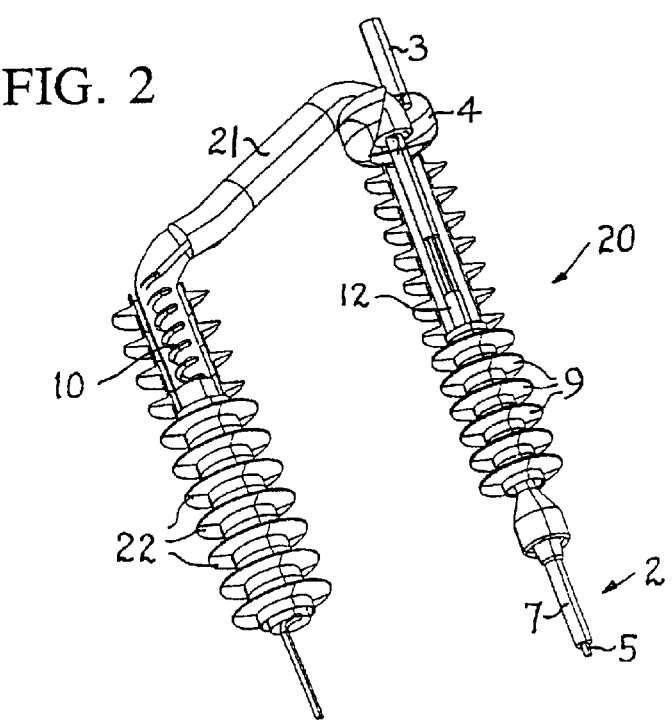
FIG. 2 is a schematic, partially cut away, perspective view of another embodiment of a power cable termination according to the invention.

The cable termination 20 shown in FIG. 2 is similar in many respects to the termination 1 shown in FIGS. 1 and 5 where possible the same reference numerals have been used in the two figures to identify the same or similar parts. The main difference between the two terminations 1 and 20 is that the second tube 10 of termination 20 is not wound back around the first tube 5 but, instead, leaves the termination at the corona shield 4. As shown, the second tube 10 projects through the toroidal corona shield before being connected to a cooling machine (not shown). The second tube 10 is surrounded by thermally insulating material 21, e.g. void-free, solid plastics material, between the corona shield 4 and the cooling machine (not shown) and also a string of electrical insulators 22. Thermal insulation 12 is also arranged between the cable terminating device and the corona shield 4 in the annular space between the electrically insulating material surrounding the superconducting wire or tape and the string of electrically insulating elements 9.

Figure 4:
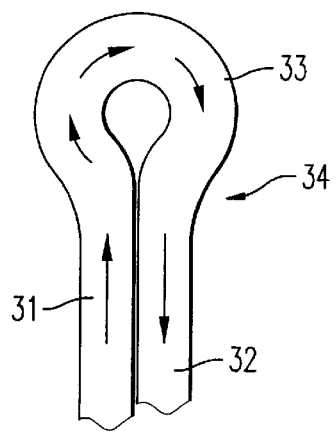
FIG. 4 is a detail on an enlarged scale of a part of the termination shown in FIG. 3.
Figure 3:
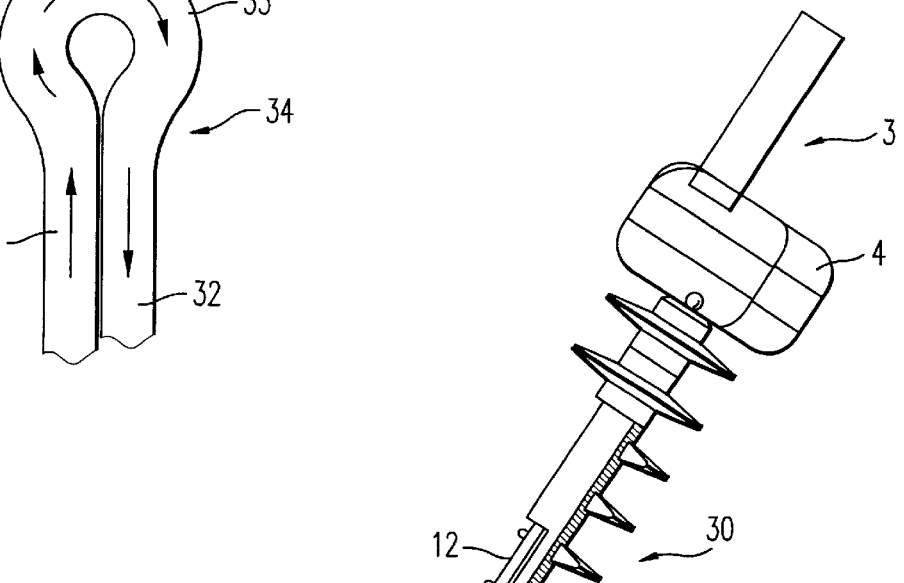
FIG. 3 is a schematic, partially cut away, view of a yet further embodiment of a power cable termination according to the invention.
Figure 3:
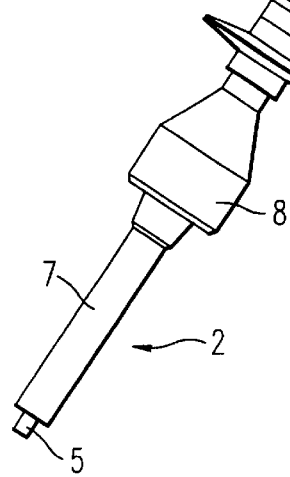

FIGS. 3 and 4 show a further embodiment of a superconducting cable termination according to the invention and designated by the reference numeral 30 The cable termination 30 is similar in many respects to the terminations 1 and 20 and where possible the same reference numerals have been used to identify the same or similar parts. The main difference between the termination 30 and the two terminations 1 and 20 is that, in the termination 30, the HTS cable 2 is provided with two centrally positioned inner tube portions 31 and 32 about which the superconducting wire or tape is wound. These tube portions 31 and 32 are joined together by a return bend tube portion 33 (see FIG. 4) at the end of the cable where the superconducting tape or wire is joined, e.g. soldered to the corona shield 4. The tube portion 33 may be a separate tubular connector connected to the tube portions 31 and 32. Alternatively the tube portions 31–33 may be portions of a single, integral tube 34 which is merely bent at tube portion 33. In other respects the termination design is similar to the termination 1 shown in FIG. 1.

Instead of winding the superconducting wire or tape around the two inner tube portions 31 and 32, a central tubular support may have a single tube (not shown) divided up to a short distance from the tube end by an internal partition to provide supply and return ducts for the cryogenic fluid which communicate with each other at the tube end. The cooling efficiency can be slightly improved by constructing the support tube and/or its inner partition as a helix so that the surrounding superconducting wire or tape is cooled along a helical path. Alternatively the support tube could be designed as a pair of concentric tubes, the inner tube serving as a return duct for the cryogenic fluid, the superconducting wire or tape being wound on the outside of the outer tube and the annular gap between the inner and outer tubes providing a supply duct for the cryogenic fluid.

In each of the terminations 1, 20 and 30 described above, the thermal and electrical insulation of the termination in question are separated. In particular the cryogenic coolant fluid for cooling the superconductor to superconducting temperatures serves solely as a cooling medium and is not used in addition for electrically insulating purposes. Thus the cryogenic fluid does not serve as a dielectric unlike in known superconducting power cable terminations. In this manner known problems associated with nitrogen gas bubbles being generated in the surrounding electric insulation are avoided.

The HTS cable described may be of any convenient design and is not limited to the specific cryogenic dielectric design described in the specific embodiments. Thus, for example, the HTS cable may be of a so-called room temperature dielectric design with the superconductor externally thermally insulated from electric insulation by thermal super-insulation contained between corrugated metal tubes.

Although the present invention is primarily directed to a power cable termination for terminating a power cable with a conductor having superconducting properties which are cooled in use to superconducting temperatures, e.g. by liquid nitrogen at 77 K, the invention is also intended to embrace conductors which have improved electrical conductivity at a low operating temperature, up to, but preferably no more than, 200 K, but which may not possess superconducting properties at least at the intended low operating temperature. At these higher cryogenic temperatures, liquid carbon dioxide can be used for cooling the conductor.

The power cable termination is intended for use as a termination in electrical apparatus, e.g. high voltage induction devices such as power transformers, generators and energy storage devices, such as SEES devices.

The electrical insulation used in a power cable termination, power cable or electrical apparatus according to the invention is intended to be able to handle very high voltages and the consequent electric and thermal loads which may arise at these voltages. By way of example, a power termination according to the invention can be used in terminations for power transformers having rated powers from a few hundred kVA up to more than 1000 MVA and with rated voltages ranging from 3–4 kV up to very high transmission voltages of 400–800 kV. At high operating voltages, partial discharges, or PD, constitute a serious problem for known insulation systems. If cavities or pores are present in the insulation, internal corona discharge may arise whereby the insulating material is gradually degraded eventually leading to breakdown of the insulation. The electric load on the electrical insulation of the power cable of a termination according to the present invention is reduced by ensuring that the inner layer of the insulation is at substantially the same electric potential as the inner conducting means and the outer layer of the insulation is at a controlled, e.g. earth, potential. Thus the electric field in the intermediate layer of insulating material between the inner and outer layers is distributed substantially uniformly over the thickness of the intermediate layer. Furthermore, by having materials with similar thermal properties and with few defects in the layers of the insulating material, the possibility of PD is reduced at a given operating voltages. The power cable of the termination can thus be designed to withstand very high operating voltages, typically up to 800 kV or higher.

Although it is preferred that the electrical insulation 7 should be extruded in position, it is possible to build up an electrical insulation system from tightly wound, overlapping layers of film or sheet-like material. Both the semiconducting layers and the electrically insulating layer can be formed in this manner. An insulation system can be made of an all-synthetic film with inner and outer semiconducting layers or portions made of polymeric thin film of, for example, PP, PET, LDPE or HDPE with embedded conducting particles, such as carbon black or metallic particles and with an insulating layer or portion between the semiconducting layers or portions.

For the lapped concept a sufficiently thin film will have butt gaps smaller than the so-called Paschen minima, thus rendering liquid impregnation unnecessary. A dry, wound multilayer thin film insulation has also good thermal properties and can be combined with a superconducting pipe as an electric conductor and have coolant, such as liquid nitrogen, pumped through the pipe.

Another example of an electrical insulation system is similar to a conventional cellulose based cable, where a thin cellulose based or synthetic paper or non-woven material is lap wound around a conductor. In this case the semiconducting layers, on either side of an insulating layer, can be made of cellulose paper or non-woven material made from fibres of insulating material and with conducting particles embedded. The insulating layer can be made from the same base material or another material can be used.

Another example of an insulation system is obtained by combining film and fibrous insulating material, either as a laminate or as co-lapped. An example of this insulation system is the commercially available so-called paper polypropylene laminate, PPLP, but several other combinations of film and fibrous parts are possible. In these systems various impregnations such as mineral oil or liquid nitrogen can be used.

What is claimed is:

1. A high voltage power cable termination, comprising:
   a current lead;
   a power cable having
      an inner first tube, and
      an outer conductor being arranged around the first tube and having electrically conducting properties that improve at low temperatures, and configured to be cooled to low temperatures by a cryogenic fluid flowing through said inner first tube;
   a joint that electrically connects one end of said current lead to said conductor near one end of said inner first tube; and
   a second tube communicating with said inner first tube near said joint for conveying said cryogenic fluid to said inner first tube, wherein
   said inner first tube and said second tube being arranged so that, in use, none of said cryogenic fluid conveyed by said inner first tube and said second tube contacts at least one of said outer conductor and said current lead at said joint.

2. A high voltage power cable termination according to claim 1, wherein:
   said electrically conducting properties of said outer conductor improve at temperatures below 200 K.

3. A high voltage power cable termination according to claim 1, wherein:
   said outer conductor having superconducting properties, said outer conductor being cooled to superconducting temperatures by said cryogenic fluid.

4. A high voltage power cable termination according to claim 3, wherein:
   said outer conductor comprises a high temperature, high-$T_c$, superconducting material.

5. A high voltage power cable termination according to claim 4, wherein:
   said high-$T_c$ superconducting material comprises at least one of silver sheathed BSCCO, [Bi, Pb]SrCaCUO, wire and tape.

6. A high voltage power cable termination according to claim 1, wherein:
   said outer conductor of a main portion of said power cable being surrounded by an electrical insulation of solid, polymeric material configured to provide a radial electric field contained within said electrical insulation;
   a cable terminating device spaced from said one end of the power cable configured to convert the radial electric field to a substantially axial electric field; and
   an end portion of said cable terminating device extending to said one end of the power cable.

7. A high voltage power cable termination according to claim 6, wherein:
   said joint comprises a high electric potential metallic corona shield to which said current lead and said outer conductor being electrically connected.

8. A high voltage power cable termination according to claim 6, wherein:
   said electrical insulation comprises
      an inner layer of semiconducting material electrically connected to said conductor,
      an outer layer of semiconducting material connected to a node at a controlled electric potential along a length thereof, and
      an intermediate layer of electrically insulating material disposed between said inner layer of semiconducting material and said outer layer of semiconducting material.

9. A high voltage power cable termination according to claim 8, wherein:
   said inner layer of semiconducting material and said intermediate layer of electrically insulating material also surround said outer conductor along an end portion of the power cable, but said outer layer of semiconducting material does not extend along said end portion.

10. A high voltage power cable termination according to claim 8, wherein:
    said inner layer of semiconducting material and said outer layer of semiconducting material each having a resistivity in an inclusive range of 1 through $10^5$ ohm-cm.

11. A high voltage power cable termination according to claim 8, wherein:
    said intermediate layer of electrically insulating material comprises a polymeric material.

12. A high voltage power cable termination according to claim 11, wherein:
said polymeric material comprises at least one of
a low density polyethylene (LDPE),
a high density polyethylene (HDPE),
a polypropylene (PP),
a cross-linked material, and
a rubber insulation, which includes at least one of an ethylene propylene rubber (EPR) and a silicone rubber.

13. A high voltage power cable termination according to claim 8, wherein:
at least one of said inner layer of semiconducting material and said outer layer of semiconducting material being formed of a polymeric material with highly electrically conductive particles.

14. A high voltage power cable termination according to claim 13, wherein:
said highly electrically conductive particles include at least one of carbon black and metallic particles.

15. A high voltage power cable termination according to claims 6, further comprising:
a string of axially arranged annular insulating elements, that surround said end portion of the cable and extend between said cable terminating device and said joint.

16. A high voltage power cable termination according to claim 15, further comprising:
a thermal insulation being provided along said end portion of said high voltage power cable termination radially inwardly of surrounding annular insulating elements.

17. A high voltage power cable termination according to claim 16, wherein:
said second tube extends back from said joint and inside said string of annular insulating elements before being led away from the high voltage power cable termination.

18. A high voltage power cable termination according to claim 17, wherein:
said second tube being wound around said inner first tube.

19. A high voltage power cable termination according to claim 17, wherein:
said thermal insulation being arranged between said second tube and said surrounding string of annular insulating elements.

20. A high voltage power cable termination according to claim 6, wherein:
said electrical insulation being for containing an electric field associated with a voltage on said outer conductor in excess 36 kV.

21. A high voltage power cable termination according to claim 6, wherein:
said electrical insulation being for handling a power in excess of 0.5 MVA.

22. A high voltage power cable termination according to claim 6, wherein:
said second tube being led directly away from said high voltage power cable termination at said joint.

23. A high voltage power cable termination according to claim 22, wherein:
said second tube after being led away from said high voltage power cable termination and being surrounded by a thermal insulation.

24. A high voltage power cable termination according to claim 23, wherein:
said second tube after being led away from said high voltage power cable termination being surrounded by a string of annular insulating elements.

25. A high voltage power cable termination according to claim 1, wherein:
said inner first tube and said second tube having
a coolant supply, and
a plurality of return ducts of a central coolant ducting member of said power cable around which said conductor being in at least one of a tape and a wire form, being helically wound.

26. A high voltage power cable termination according to claim 25, wherein:
said central coolant ducting member being formed as a single tube with a return bend portion at a joint connecting said inner first tube and said second tube being configured to convey said cryogenic fluid in opposite directions internally within the power cable.

27. A high voltage power cable termination according to claim 25, wherein:
said central coolant ducting member being divided internally to provide said inner first tube and said second tube, said inner first tube and said second tube communicating with each other at one end of the first tube.

28. A high voltage power cable termination according to claim 27, wherein:
said central coolant ducting member being divided internally by a diametric partition wall.

29. A high voltage power cable termination according to claim 27, wherein:
at least one of said central coolant ducting member being divided internally and an internal partition wall, being helically twisted.

30. A high voltage power cable termination, according to claim 1, wherein:
said high voltage power cable termination being provided to a power cable.

31. A high voltage power cable termination, according to claim 1, wherein:
said high voltage power cable termination being provided to an electrical apparatus.

32. A high voltage power cable termination, according to claim 1, wherein:
said power cable having means for holding a high voltage and means for containing an electrical field in said outer conductor.

* * * * *